United States Patent [19]

Lee et al.

[11] Patent Number: 5,818,743
[45] Date of Patent: Oct. 6, 1998

[54] LOW POWER MULTIPLIER

[75] Inventors: Wai Lee, Plano, Tex.; Toshiyuki Sakuta, Ome, Japan

[73] Assignee: Texas Instruments Incorporated, Dallas, Tex.

[21] Appl. No.: 426,349

[22] Filed: Apr. 21, 1995

[51] Int. Cl.$^6$ ........................................................ G06F 7/52
[52] U.S. Cl. .............................. 364/760.01; 364/760.03
[58] Field of Search ...................................... 364/707, 757, 364/758, 759, 760, 784, 786, 787, 788

[56] References Cited

U.S. PATENT DOCUMENTS

| | | | |
|---|---|---|---|
| 4,811,270 | 3/1989 | Nash ........................................ | 364/760 |
| 4,982,355 | 1/1991 | Nishimura et al. ...................... | 364/758 |
| 5,010,509 | 4/1991 | Cox et al. ............................... | 364/784 X |
| 5,153,848 | 10/1992 | Elkind et al. .......................... | 364/760 X |
| 5,333,119 | 7/1994 | Raatz et al. ............................. | 364/760 |

OTHER PUBLICATIONS

A.D. Booth, "A signed Binary Multiplication Technique", The Quarterly Journal of Mechanics and Applied Mathematics vol. IV, 1951, pp. 236–240.

C.S. Wallace, "A Suggestion for a Fast Multiplier", IEEE Transactions on Electronic Computers, Feb. 1964, pp. 14–17.

L. Dadda, Some Schemes for Parallel Multipliers, Alta Frequenzia, vol. XXXIV, No. 5, May 1965, pp. 349–356.

L. Dadda, "On Parallel Digital Multipliers", Alta Frequenzia, vol. XLV, No. 10, Oct. 1976, pp. 574–580.

P.J. Song, "Circuit and Architecture Trade–offs for High–Speed Multiplication", IEEE Journal of Solid–State Circuits, vol. 26, No. 9, Sep. 1991, pp. 1184–1198.

Ching–Long, Su, "Low Power Architecture Design and Compilation Techniques for High–Performance Processors", IEEE Reprint 1063–6390/94, 1994, pp. 489–498.

C. Lemonds, "A Low Power 16 by 16 Multiplier Using Transition Reduction Circuitry", Int'l Workshop on L/P Design, Dig. Tech. papers, Apr. 1994, pp. 139–142.

Leijten, et al. "Analysis and Reduction of Glitches in Synchronous Networks", European Design & Test Conf., Dig. Tech. papers, Mar. 1995, pp. 398–403.

*Primary Examiner*—Chuong Dinh Ngo
*Attorney, Agent, or Firm*—J. Dennis Moore; James C. Kesterson; Richard L. Donaldson

[57] ABSTRACT

A digital multiplier 110 for multiplying a plurality of multiplicand signals X0–X23 representing a multiplicand and a plurality of multiplier signals Y0–Y23 representing a multiplier. In it, a plurality of intermediate results signals, such as partial product signals, are generated from the multiplicand signals and the multiplier signals. A plurality of adder circuits 40 are also provided for adding the intermediate results signals to generate a plurality of final result signals representing the result of multiplying the multiplicand and the multiplier, wherein at least some of the adder circuits receive first signals representing intermediate addition results from at least two prior adder stages and also receive second signals representing intermediate results generated as the result of only a single addition. Finally, a plurality of delay elements 70 are placed in selected second signal lines so as to delay the arrival of the second signals to the at least some of the adder circuits so as to synchronize the arrival of the inputs to the at least some of the adder circuits.

2 Claims, 14 Drawing Sheets

LOW POWER MULTIPLIER

BACKGROUND OF THE INVENTION

1. Technical Field of the Invention

This invention relates to digital processing logic circuits, and more particularly relates to a low power multiplier circuit.

2. Background Art

Digital processing circuits are being designed to operate at lower and lower supply voltages. This is being driven by various forces, including consumer demand for portable personal computers and ever decreasing device dimensions in integrated circuits.

To retain desired performance, or speed, in multiplier circuits as supply voltages decrease it is desirable to exploit parallelism in the multiplier architecture. Parallel multipliers include, e.g., array multipliers and Wallace-tree multipliers. Parallel multiplier architectures tend to operate at higher speed than non-parallel multipliers. Unfortunately, parallel multipliers also usually dissipate a large amount of power during operation. As a general matter, array multipliers tend to have lower performance (slower speed) and consume more power, as compared with Wallace-tree multipliers.

One of the major sources of power dissipation in parallel multipliers is the large number of spurious logic transitions that occur at the internal nodes of such multipliers. Such multipliers are typically implemented in the form of some kind of logic array in which multiple additions of intermediate values, such as partial products and partial sums of partial products, may be performed, including the addition of carry products at various places throughout the array. As the intermediate values propagate through the circuit, the logic states of the various logic gates, such as adders, may change, sometimes many times, before the final state of the inputs of such logic gates is finally resolved. This is discussed in, e.g., *Analysis and Reduction of Glitches in Synchronous Networks*, by J. Leijten, et al., European Design & Test Conf., Dig. Tech. papers, pp. 398–403, March 1995. Those authors suggest deploying flipflops in the circuit, which are clocked at the same time to deliver their outputs together, as an approach to reduce spurious transitions.

Another approach suggested to reduce such spurious transitions is made in *A Low Power 16 by 16 Multiplier Using Transition Reduction Circuitry*, by C. Lemonds, et al., Intl. Workshop on L/P Design, Dig. Tech. papers, pp. 139–142, April 1994, in conjunction with multipliers including Booth encoders. As is known, a Booth encoder applies logic to the inputs of a multiplier that reduces the number of partial products required to be created in the array. Those authors propose putting latches on the outputs of the Booth encoder portion of a multiplier. The latches are then clocked in a precise sequence so as to deliver the encoded inputs to the sequential stages within the array more closely in time with the respective carry and sum output signals from the previous adder/multiplexer stage in the array with which the encoded inputs are to be combined.

However, both of the aforementioned approaches present problems. For example, in the Leijten, et al., approach the numerous flipflops introduce additional delay in the form of the propagation delay of the flipflop itself, multiplied by the number of stages in which the flipflops are deployed. In addition, the flipflops take up valuable integrated circuit area. As for the Lemonds, et al., approach, the clock signal must be delivered to the multiplier circuit, requiring additional wiring into the circuit, and the clock timing must be controlled precisely to produce the desired result. In addition, the latches themselves consume power, which tends to defeat the very purpose for which they are used, although in some applications the net result can be an improvement in power dissipation. Also, the latches take up integrated circuit area.

Thus, it is desired to have a multiplier circuit employing parallel architecture that provides good performance at low power. The present invention provides just such a multiplier.

SUMMARY OF THE INVENTION

In accordance with the principles of the present invention, there is provided, according to a first embodiment, a digital multiplier for multiplying a plurality of multiplicand signals representing a multiplicand and a plurality of multiplier signals representing a multiplier. In it, a plurality of intermediate results signals are generated from the multiplicand signals and from said multiplier signals. A plurality of adder circuits for adding the intermediate results signals are provided to generate a plurality of final result signals representing the result of multiplying the multiplicand and the multiplier, wherein at least some of the adder circuits receive at the inputs thereof at least two signals representing intermediate addition results. Finally, a plurality of delay elements are placed in selected signal lines so as to delay the arrival of at least one of the signals representing intermediate addition results to the at least some of the adder circuits so as to synchronize the arrival of the signals input to the at least some of the adder circuits.

In accordance with a second embodiment of the present invention there is provided a Wallace-tree multiplier for multiplying a multiplicand signal and a multiplier signal. A plurality of partial product signals are generated from the multiplicand signals and the multiplier signals. Also provided are a plurality of adder circuits for adding the partial product signals to generate result signals representing the result of multiplying the multiplicand and the multiplier, arranged in a Wallace-tree configuration, at least some of the adder circuits being a (4:2) counter circuit. The (4:2) counter circuit includes a first three-input adder circuit generating as outputs a first sum signal and a first carry-out signal and receiving as inputs three of the four inputs to the four-input adder circuit, and also includes a delay element receiving as an input the fourth of the four inputs to the four-input adder circuit and providing as an output the signal applied to its input but delayed by a predetermined time interval. Finally, the (4:2) counter includes as well a second three-input adder circuit generating as outputs a second sum signal and a second carry-out signal, receiving as inputs a carry-in signal, the first sum signal and the output signal of the delay element. The predetermined time interval is selected so as to delay the arrival of the fourth input to the four-input adder circuit to the second three-input adder circuit by a time selected so as to cause the fourth input signal to arrive at the second three-input adder circuit closer in time to the time the other two inputs of the three-input adder circuit arrive at the three-input adder circuit.

In accordance with a third embodiment of the present invention there is provided a full adder circuit receiving three inputs and providing a sum output signal and a carry output signal. The full adder circuit includes a three input exclusive OR logic element for generating the sum output signal provided at an output thereof, a three input majority selector logic element for generating the carry output signal provided at an output thereof. The three input exclusive OR logic element and the three input majority selector are made of pass gate field effect transistor devices, arranged so as to perform the exclusive OR function and the majority selection function, respectively, and also arranged such that the same number of pass gate field effect devices are disposed between the inputs and said outputs in the three input exclusive OR logic element and in the three input majority selector logic element.

These and other features of the invention will be apparent to those skilled in the art from the following detailed description of the invention, taken together with the accompanying drawings.

DETAILED DESCRIPTION OF THE INVENTION

Figure 1:
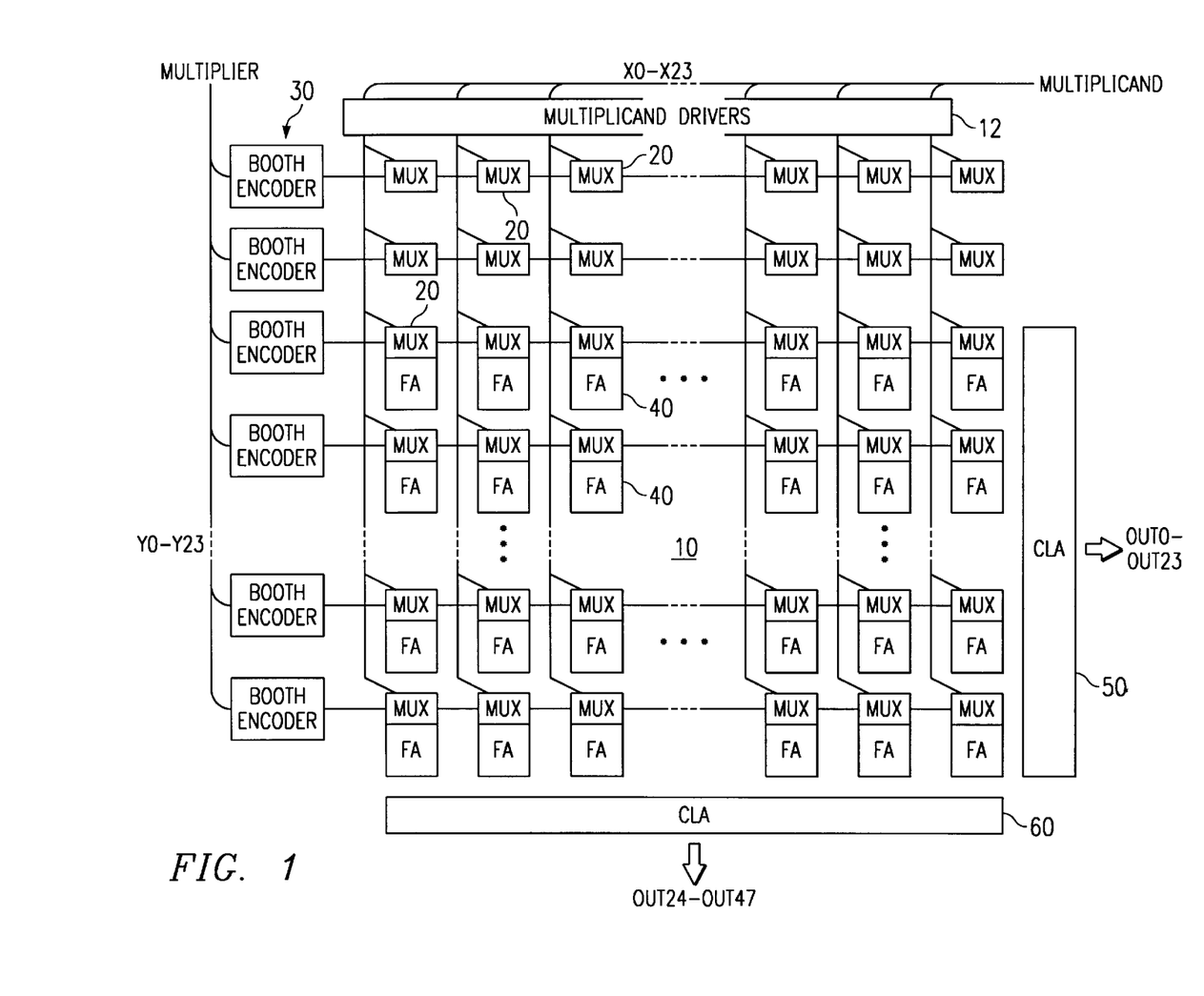
FIG. 1 is a block diagram of a prior art multiplier array.

FIG. 1 is a functional block diagram of a typical prior art array multiplier 10. A twenty-four bit set of multiplicand signals provided on lines X0–X23 is multiplied by a twenty-four bit set of multiplier signals provided on lines Y0–Y23. The multiplicand bit lines X0–X23 are provided as twenty-four true/complement pairs which are applied to forty-eight multiplicand drivers 12 for signal amplification. The outputs of the multiplicand drivers 12 are applied to an array of multiplexers 20. The twenty-four multiplier bit lines Y0–Y23 are applied to thirteen Booth encoders 30, and the outputs thereof are also applied to the multiplexers (MUXs) 20.

The Booth encoders 30, in conjunction with the MUXs 20, perform a well known encoding that reduces the number of partial products needed to be generated and added in the array multiplier 10, as compared with an array multiplier without Booth recoding. As is known, array multipliers without Booth recoding simply generate the full set of all possible partial products using, e.g., AND gates to AND each bit value of the multiplier against each bit value of the multiplicand to generate all bits of the partial products in proper rank position. Returning, however, to FIG. 1, addition of the intermediate signals that are generated, including signals representing partial products provided as outputs of the MUXs 20 and signals representing sums of some (but not all) partial products provided as outputs of full adders 40 (collectively, intermediate results), is performed by an array of full adders 40, with a final addition being performed by two sets of carry look-ahead adders 50, 60, producing final result signals OUT0–OUT23, OUT24–OUT47, respectively. Other kinds of carry propagate adders could be used for adders 50, 60, as well. (Note that in a full adder array, the signals representing partial products, and signals representing sums of some (but not all) partial products would be considered as intermediate results, as well.)

Figure 2:
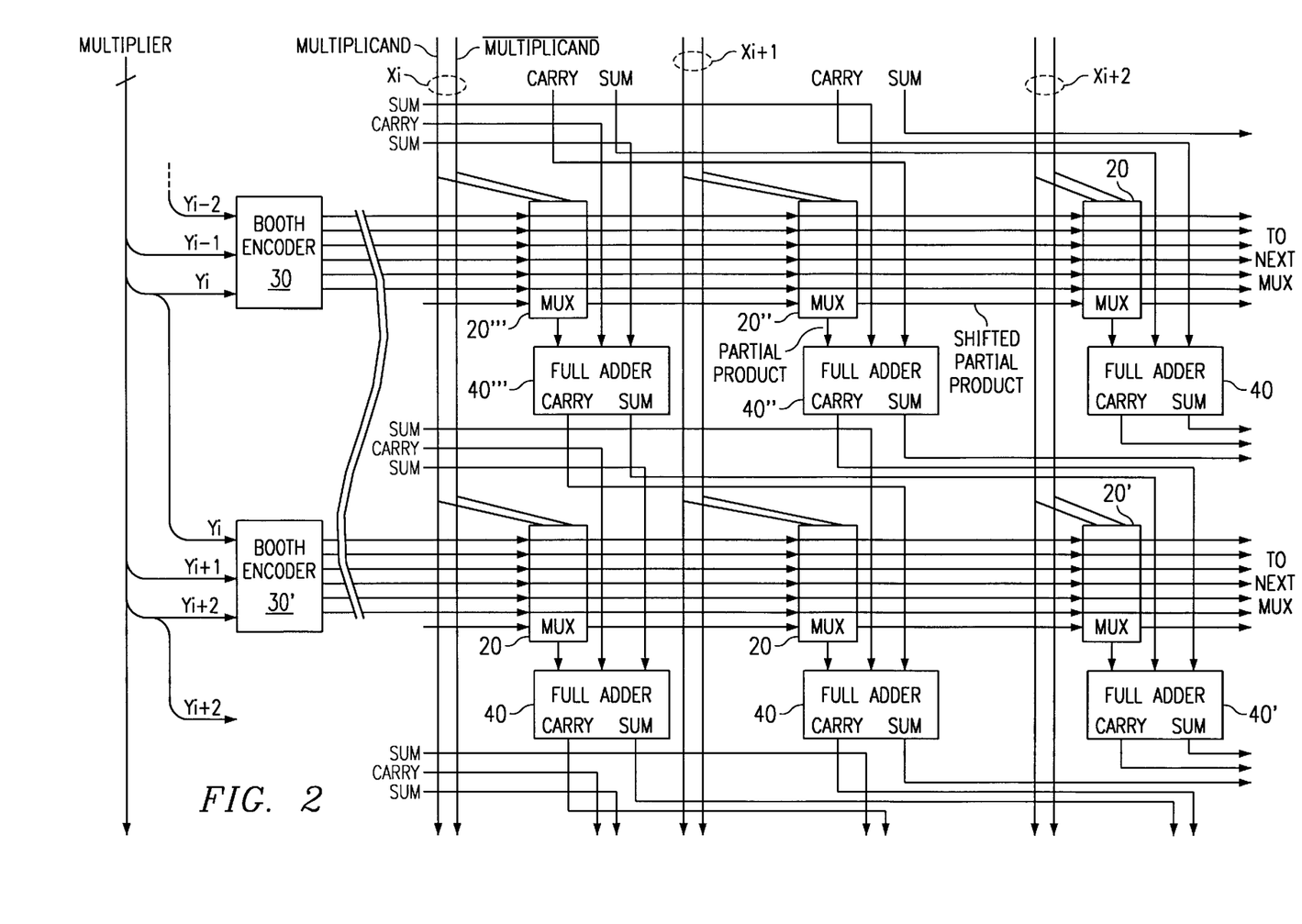
FIG. 2 is a logic diagram of a portion of the prior art multiplier array shown in FIG. 1.

Note that, in the interest of clarity, not all wire connections are shown in FIG. 1. Sum and carry outputs of the bottom-most and right-most full adders 40 connect to the individual two-input cells of the carry look-ahead adders 50, 60, by order, i.e. bit position, as is well known. Detailed interconnections of selected portions of array multiplier 10 are depicted in FIG. 2. Wiring connections for corresponding portions of the remainder of the array multiplier 10 of FIG. 1 are similar to those shown in FIG. 2. For example, the next Booth encoder 30 of FIG. 2, below the bottom of the two Booth encoders 30, 30', has as inputs Yi+2, Yi+3 and Yi+4, and the outputs thereof proceed into the array and are connected to MUXs 20 in the same way as shown for the Booth encoder 30 in FIG. 2. Note, however, that the sum and carry signals input to the topmost row of full adders 40 in FIG. 1 are generated by the top two rows of MUXs 20, as is known. Accordingly, these connections are not depicted in FIG. 2.

Referring now to FIG. 2, as an initial matter of explanation, prime designations are used merely to locate specific components in the array, and not to distinguish them otherwise from other components having the same reference numeral but no prime designation, or a different prime designation. For example, note that the full adder in the lower right corner of FIG. 2 is indicated by reference numeral 40'. This does not signify that full adder 40' is different from, say, full adder 40" in FIG. 2. Rather, their respective prime designations distinguish them in position in the figure, to aid in explaining the figure more clearly.

Now, in particular referring to full adder 40' and associated MUX 20', note that full adder 40' receives as inputs the carry output of full adder 40", the sum output of full adder 40'" and the output of MUX 20'. The output of MUX 20' is, in turn, generated from the outputs of Booth encoder 30' and from multiplicand inputs Xi+2. Also note that the carry output of full adder 40" and the sum output of full adder 40'" are generated by the stage preceding that of MUX 20' and full adder 40'. Such preceding stage has MUX 20" and full adder 40" generating a carry output signal and has MUX 20'" and full adder 40'" generating a sum output signal. These elements contribute a propagation delay to input signals Yi, Yi+1 and Yi+2. Further, depending on the position in the array of full adder 40', such preceding stage may have one or more stages preceding it as well, in addition to the drivers 12, each with their own propagation delay with respect to their input signals. On the other hand, note that the MUX 20' output, which is input to full adder 40', includes, relatively, only the delays associated with Booth encoder 30' and associated with MUX 20', which overlap. As a consequence, the carry output of full adder 40" and the sum output of full adder 40''' arrive later than the output of MUX 20'. Thus, the output of MUX 20' can prematurely switch the internal state of full adder 40', resulting in undesired power consumption, after which the carry output of full adder 40" and the sum output of full adder 40''' may each change the state of full adder 40' until all signals are present to provide the final, desired state. Such premature switching propagates down through the array 10, multiplying the power consuming effects of this undesired switching of the full adders 40'.

Figure 3:
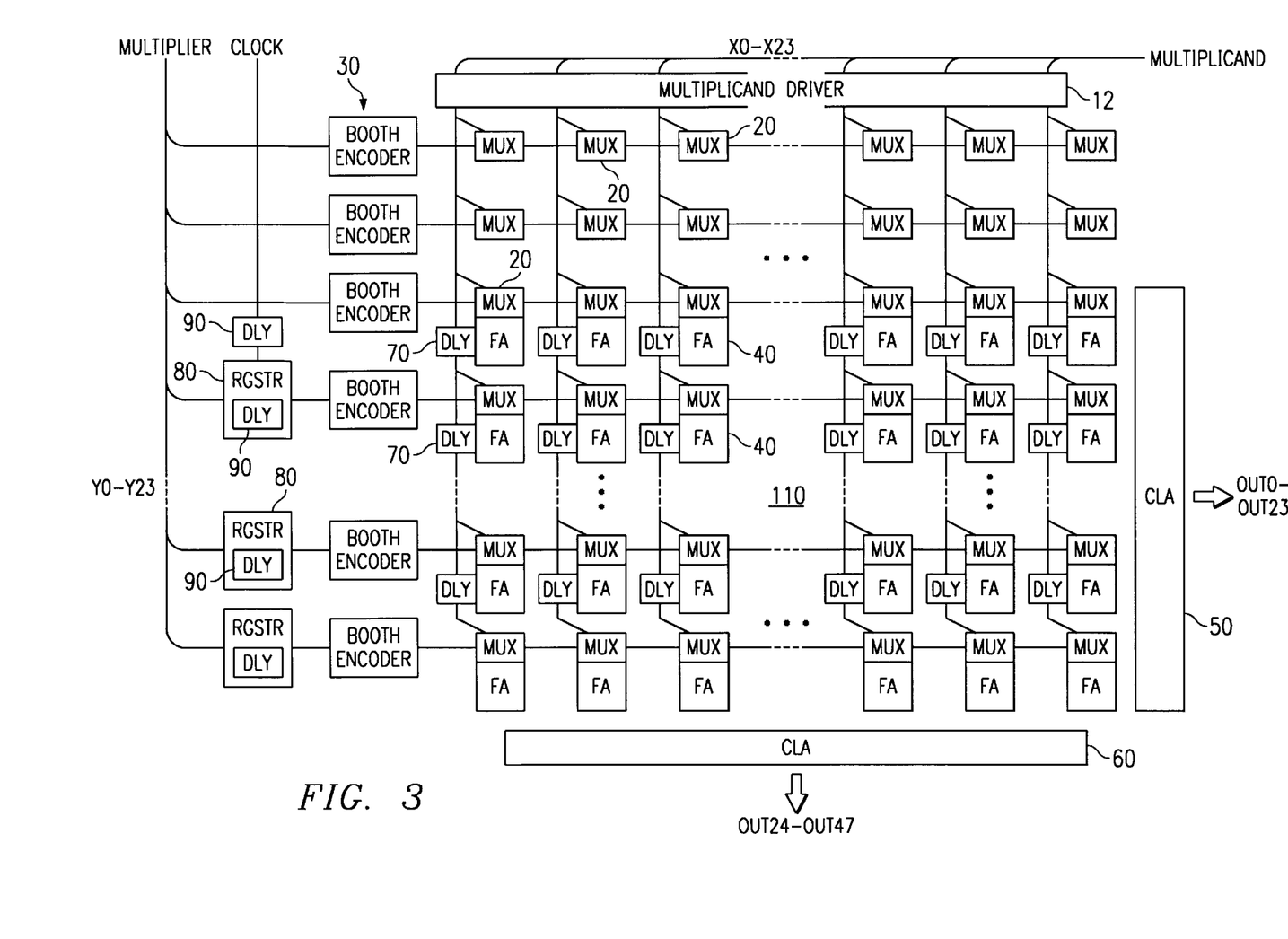
FIG. 3 is a block diagram of a first preferred embodiment of a multiplier array constructed in accordance with the principles of the present invention.

Referring now to FIG. 3, there is shown a preferred embodiment of an array multiplier 110 constructed in accordance with the principles of the present invention. The functional performance of array multiplier 110 is identical to that of array multiplier 10. However, power consuming spurious switching of the type discussed in the preceding paragraph is eliminated or reduced considerably by the techniques of the present invention. Many elements of the array multiplier 110 are like those in array multiplier 10. However, in the embodiment of FIG. 3, first synchronizing elements, or delay elements, 70 can be seen, embedded as shown in the multiplicand lines, as can be seen registers 80 and second synchronizing elements, or delay elements, 90. The additional first delay elements 70, second delay elements 90 and registers 80 cooperate to synchronize the simultaneous arrival of the input signals to the full adders 40, and thereby eliminate or reduce spurious switching of the full adders 40,saving power.

Figure 4:
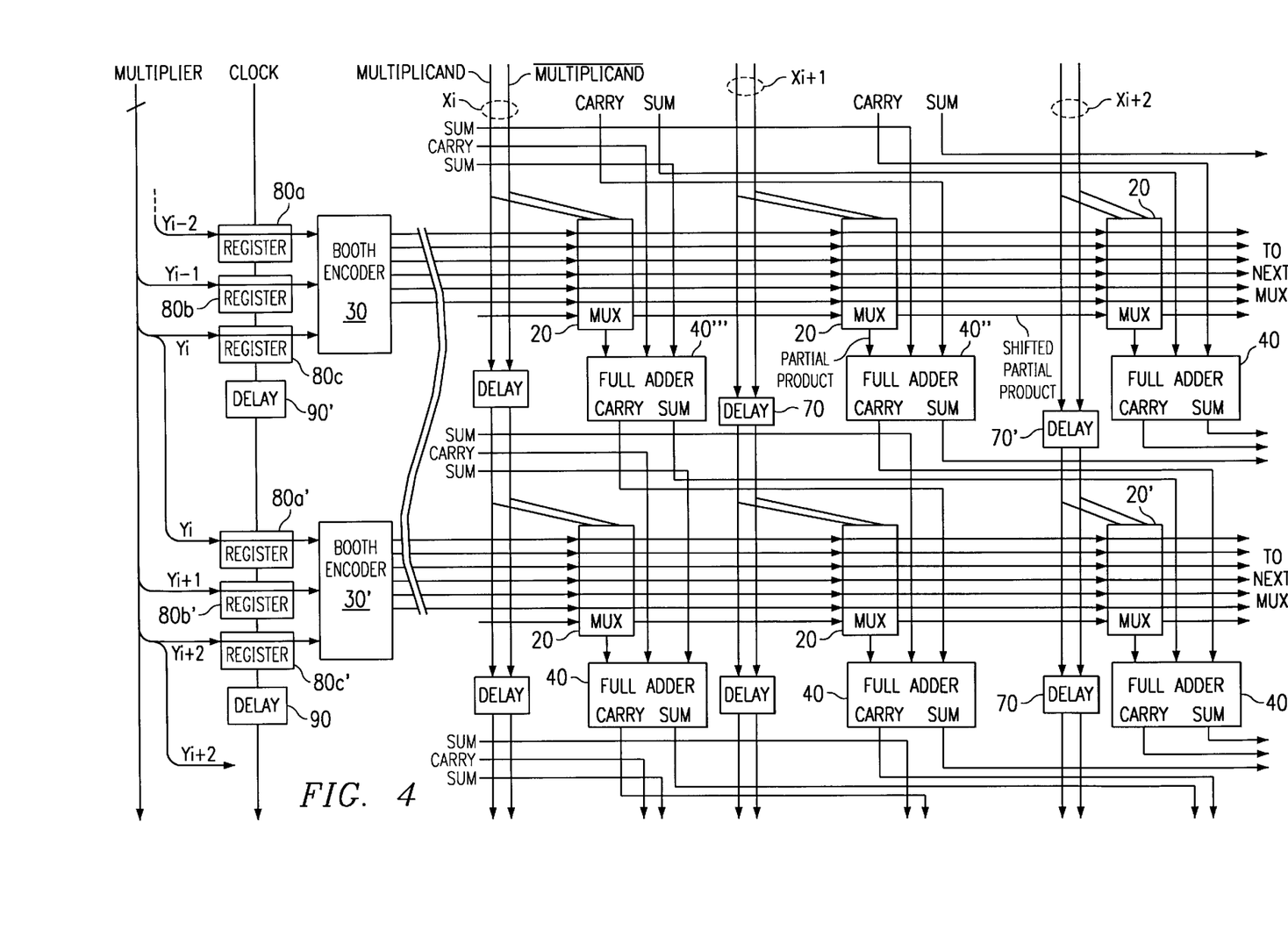
FIG. 4 is a logic diagram of a first portion of the multiplier array shown in FIG. 3.
Figure 5A:
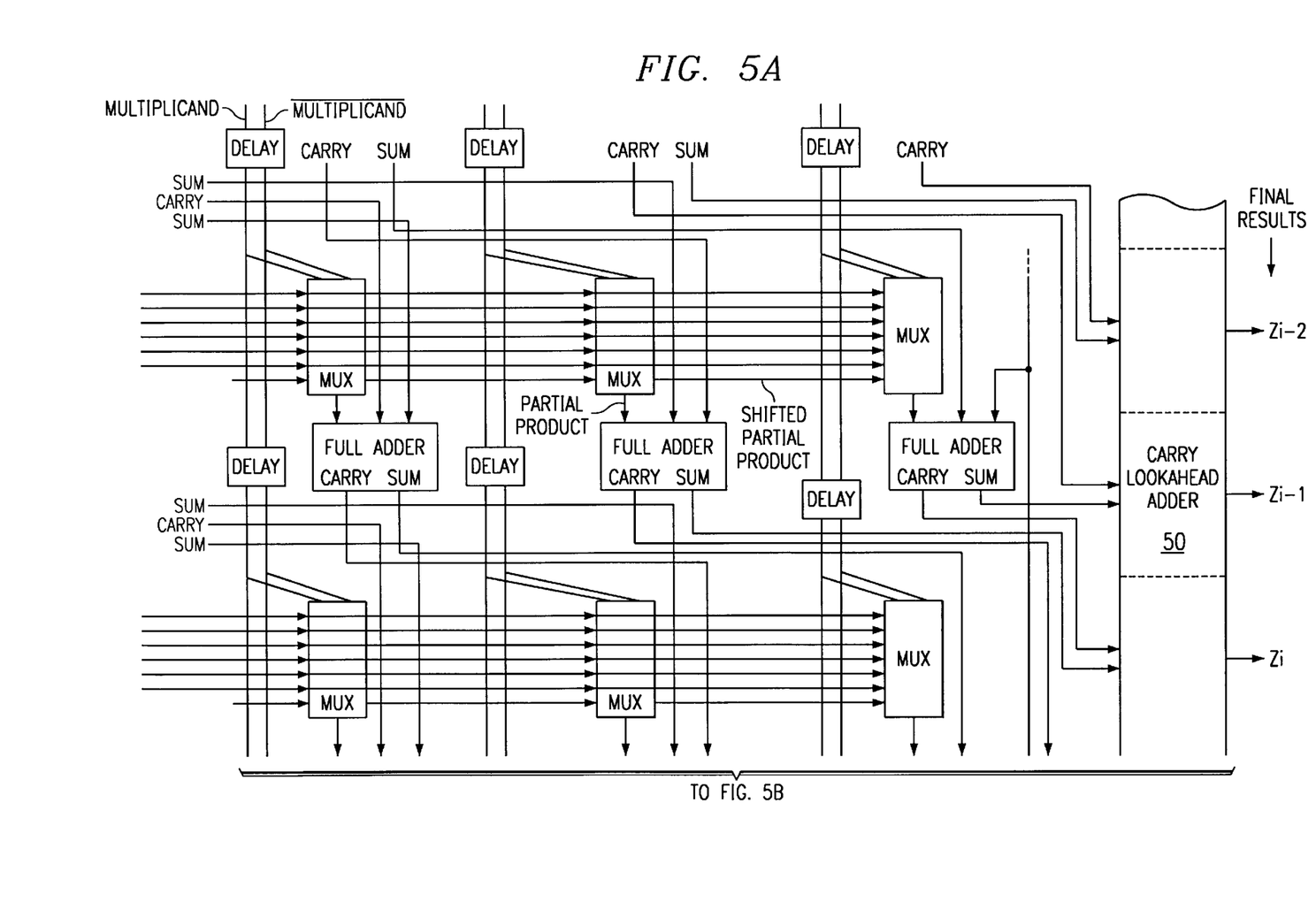
FIG. 5 is a logic diagram of a second portion of the multiplier array shown in FIG. 3.
Figure 5B:
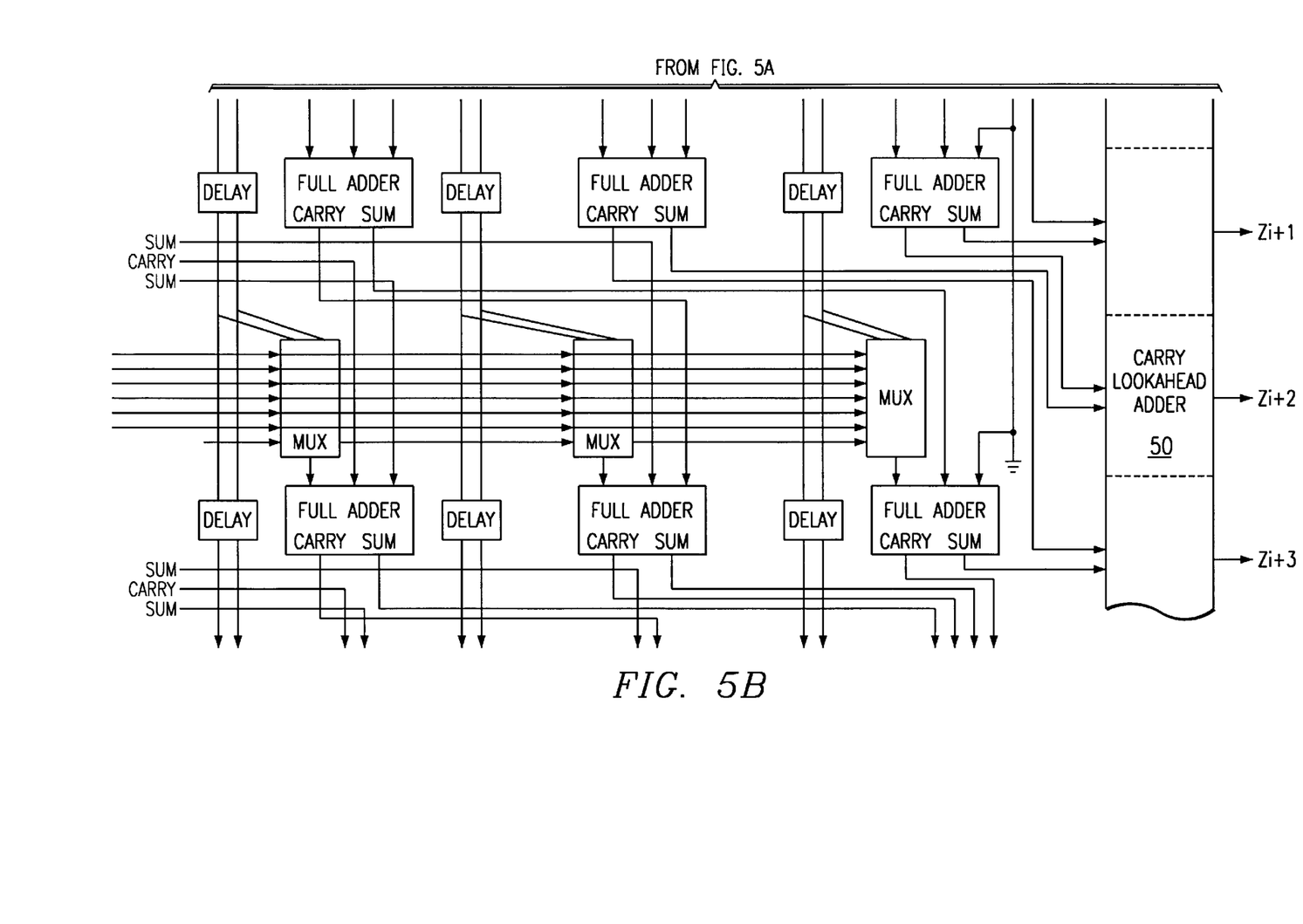
Figure 6:
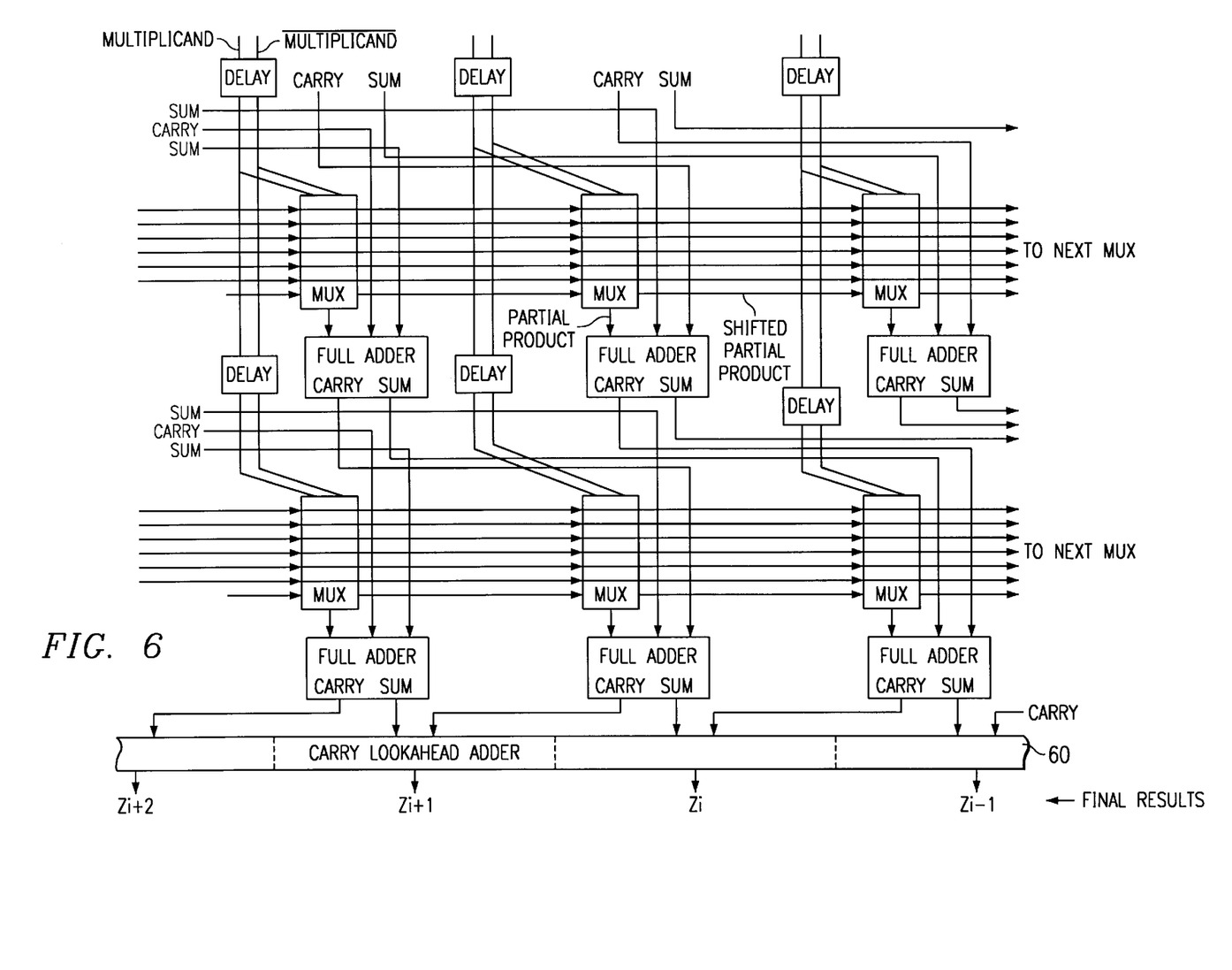
FIG. 6 is a logic diagram of a third portion of the multiplier array shown in FIG. 3.

This can be seen more clearly by referring to FIG. 4, which is a detailed view of a portion of array multiplier 110 shown in FIG. 3, similar to the view in FIG. 2, but showing the details of connection of first delay elements 70, second delay elements 90 and registers 80. Referring again to full adder 40', note that a first delay element 70' is interposed in multiplicand line Xi+2. This first delay element 70' has a time delay associated with it that is selected so as to delay the arrival of the output signal of MUX 20' by an amount of time that causes the output signal of MUX 20' to arrive at full adder 40' in synchronism with, or closer in time to, the arrival of the outputs of full adder 40" and full adder 40'''. In other words, first delay elements 70 synchronize the arrival of the inputs to the full adders 40. FIGS. 5 and 6 show the details of the wiring connections to carry look-ahead adders 50 and 60, respectively, for multiplier array 110.

Continuing to refer to FIG. 4, note that registers 80a', 80b' and 80c' are interposed in multiplier lines Yi, Yi+1 and Yi+2, respectively, before Booth encoder 30'. These registers 80a', 80b' and 80c', provide their stored signals to Booth encoder 30' in response to a clock signal on the line identified as Clock. Preferably, line Clock is provided as a true/complement pair, and registers 80a', 80b' and 80c', are configured to receive a true/complement clock pair, for improved performance. This clock signal is provided to registers 80a', 80b' and 80c', delayed by a time interval provided by second delay element 90' shown in FIG. 4 selected so as to delay the arrival of the output of Booth encoder 30' to MUX 20' (and the other MUXs 20 in the same row). This delay causes the output signal of MUX 20' to arrive at full adder 40' in synchronism with, or closer in time to the arrival of the outputs of full adder 40" and full adder 40'''. In other words, second delay elements 90, in cooperation with registers 80, contribute to the synchronization of the arrival of the inputs to the full adders 40. Note that registers could be placed at the outputs of the Booth encoders 30, and be similarly clocked in groups. However, in the embodiment being described in detail herein the multiplier bit lines Y0–Y23 are not provided as true/complement pairs, and so the Booth encoders 30 only have three inputs, while having six outputs. Hence, the registers were placed at the inputs of Booth encoders 30, resulting in the requirement for fewer registers, and accordingly less power consumption and less utilization of integrated circuit area.

All of these elements contributing to the synchronization of the arrival of inputs to full adders 40 cooperate to eliminate or reduce the aforementioned undesired premature state switching of full adders 40. In this way, undesired power consumption is significantly reduced in arrays of this type, without reducing the performance of such arrays at all.

Note that, while the foregoing description has been with respect to an array multiplier including Booth encoders, the principles of the present invention are readily applicable to multipliers in general. For example, as mentioned above, array multipliers without Booth recoding simply generate the full set of possible partial products and add them. Delay elements can be advantageously added to such arrays in accordance with the principles of the present invention, for example at the inputs of the AND gates which generate the partial products. Another example is a Wallace-tree multiplier, which is described in detail hereinbelow in connection with FIG. 13.

Figure 7A:
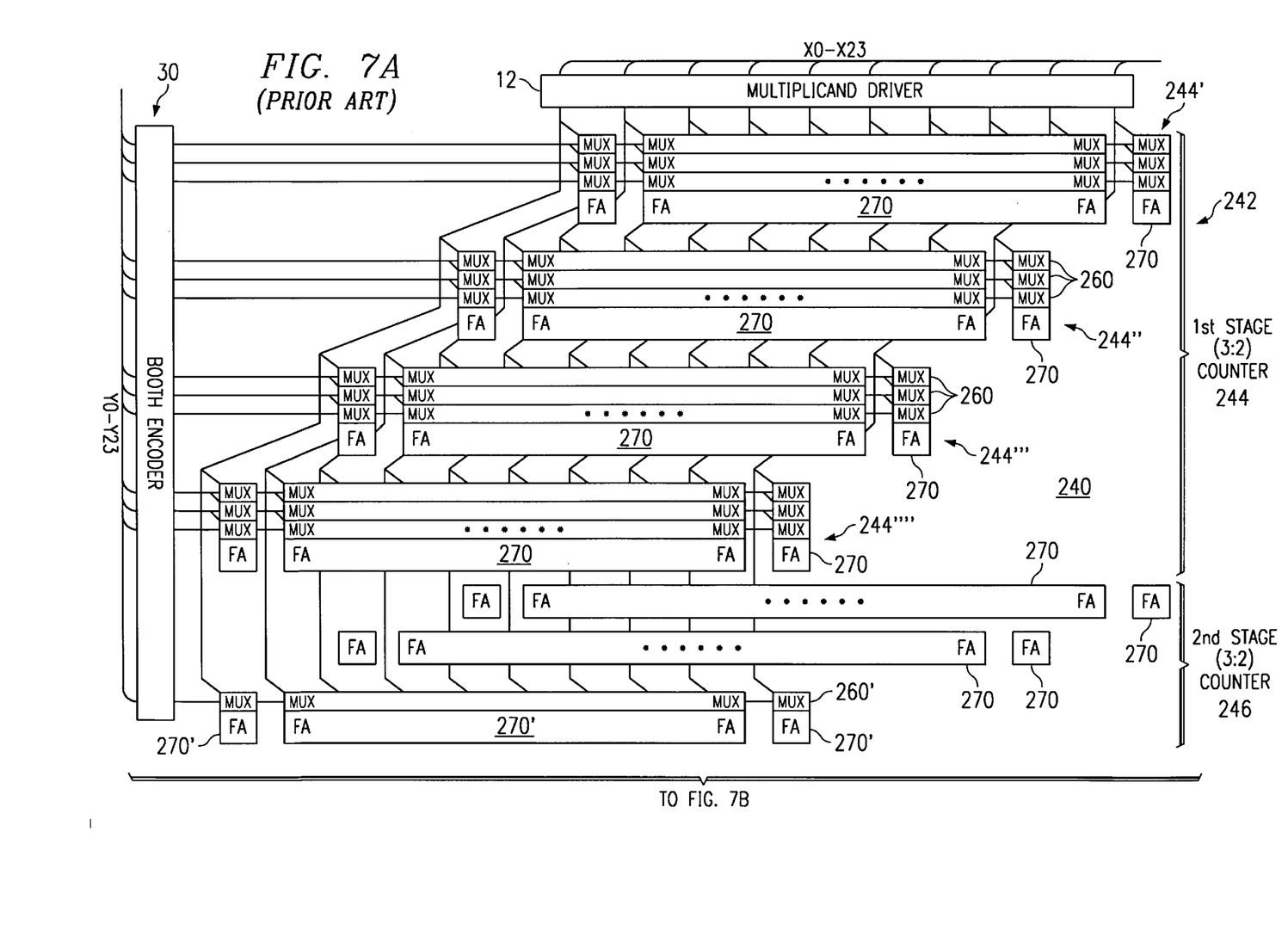
FIG. 7 is a block diagram of a prior art Wallace-tree multiplier.
Figure 7B:
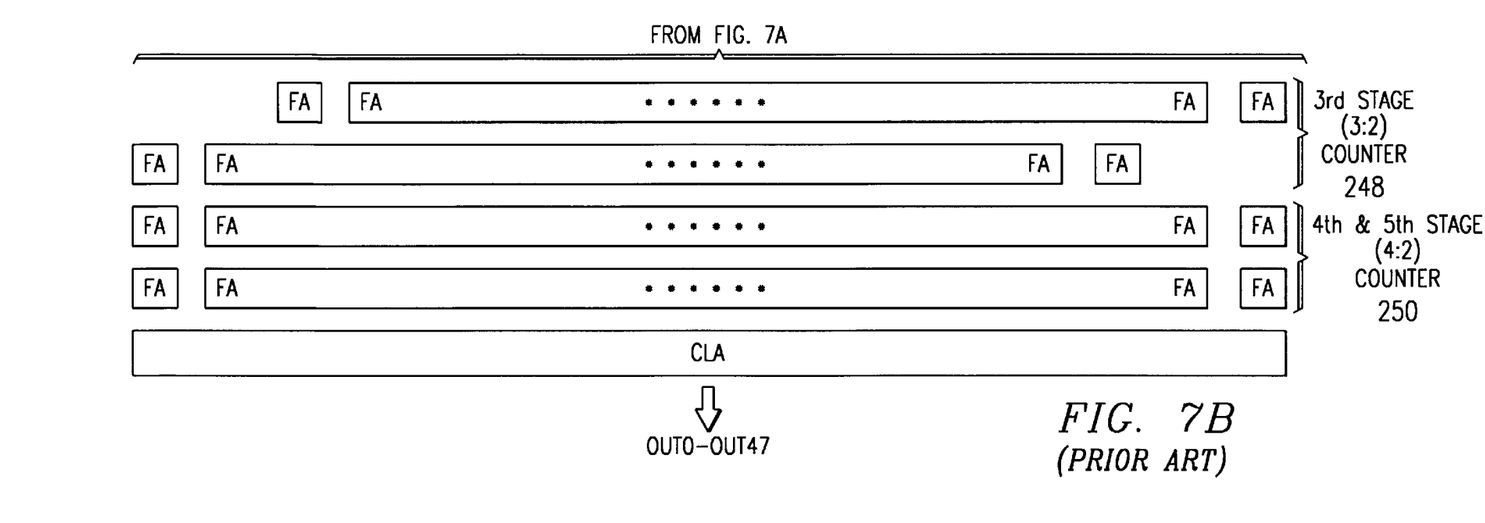
Figure 9A:
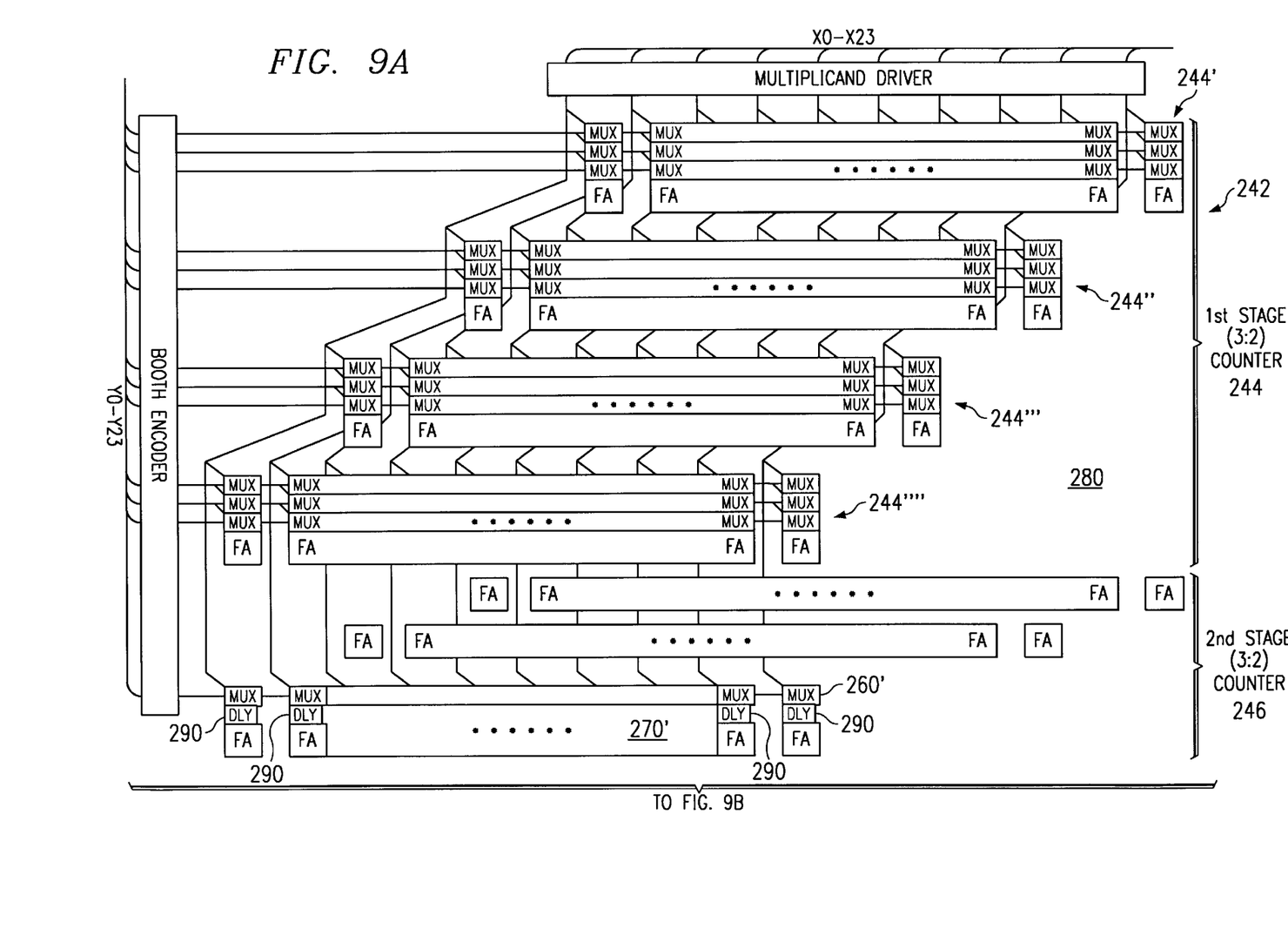
FIG. 9 is a block diagram of a second preferred embodiment of a multiplier constructed in accordance with the principles of the present invention.

Another presently preferred embodiment of the present invention is shown in FIG. 9. However, by way of introduction, reference is made first to FIG. 7. In FIG. 7 there is shown a type of prior art multiplier array 240 known as a Wallace-tree multiplier, having the same inputs as array 10. Some functional elements of multiplier array 240 are the same as those in array 10. Thus, the multiplicand drivers 12 receiving multiplicand inputs X0–X23 are the same as in FIG. 4, as are the Booth encoders 30 receiving multiplier inputs Y0–Y23.

Also, as is known, the array 240 is comprised of a series of stages 242. These stages 242 are comprised of multiplexers 260 and/or full adders 270, some of which full adders 270 are arranged in combinations that are (4:2) counters, and some of which use the full adders 270 simply as (3:2) counters. The first stage 244 has a plurality of MUXs in four parallel banks 244', 244", 244''', 244"", each receiving three of the sets of outputs of twelve of the thirteen Booth encoders 30. The intermediate results provided as outputs of the MUXs in each of the banks are added by a set of full adders 270, and the sum and carry outputs thereof are provided as inputs to the second stage 246. The second stage 246 includes further full adders 270 for further additions of the intermediate results generated by the first stage 244, and also includes a further set of full adders 270' that receive the results of the additions of the above-described full adders 270, as well as the outputs of a further set of MUXs 260' that receive the thirteenth set of outputs of the thirteen Booth encoders 30. Final additions of the intermediate results generated by the foregoing circuitry is performed by the third stage 248, which is comprised of (3:2) counters, and by the fourth stage 250, which is comprised of (4:2) counters.

Figure 8:
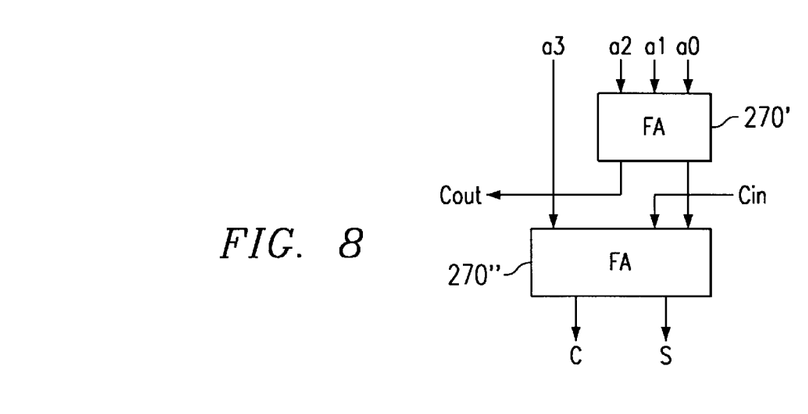
FIG. 8 is a block diagram of a prior art (4:2) counter.

FIG. 8 shows the construction of a (4:2) counter, or four input adder circuit, comprising two full adders 270' and 270". Input signal lines a0, a1 and a2 are connected to the inputs of full adder 270'. The carry output Cout of full adder 270' is the carry output for the (4:2) counter. The sum output of full adder 270' is provided as one input to full adder 270". The other two inputs of full adder 270" are the fourth input a3 and the carry input signal Cin of the (4:2) counter.

The arrangement shown in FIG. 7 is well known. Wallace-tree multipliers are desired in some applications, since such arrays incorporate logic that reduces the number of stages of addition that must be performed on partial products, and thus provide enhanced performance as compared with arrays not so arranged. Nonetheless, the Wallace-tree multiplier 240 introduces yet another type of structure that can result in undesired premature switching of the adders within the circuit. An example of this can be best understood by referring again to FIG. 12. Note that even if all four inputs a0–a3 are synchronized, because full adder 270' has an intrinsic propagation delay associated therewith, the output of full adder 270' arrives later than input a3 to full adder 270". Thus, input a3 can prematurely switch full adder 270" before the output of full adder 270' (or Cin) arrives at the input of full adder 270".

Figures 9B, 10, 11:
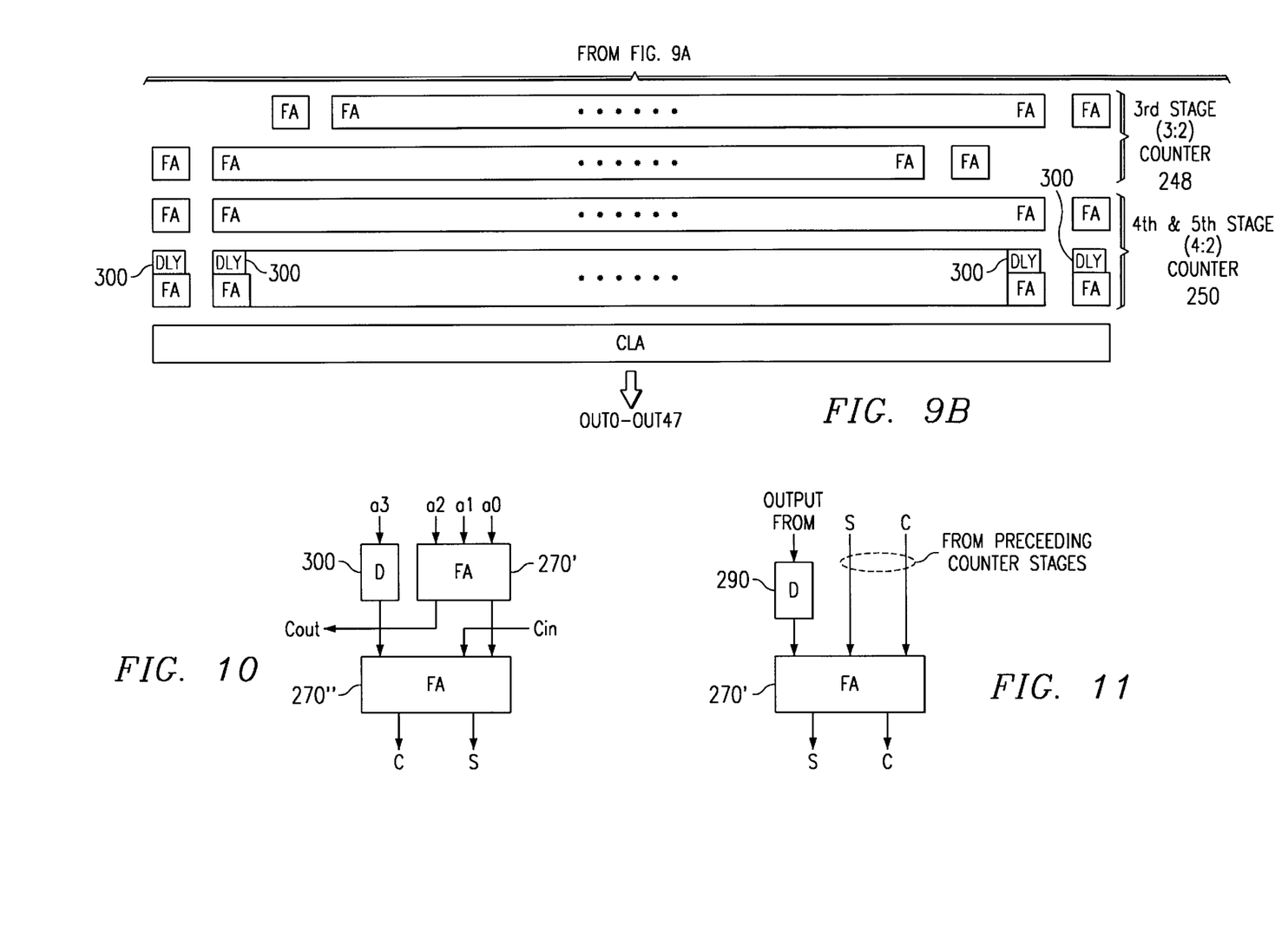
FIG. 10 is a block diagram of a preferred embodiment of a (4:2) counter constructed in accordance with the principles of the present invention.
FIG. 11 is a block diagram of a portion of the multiplier of FIG. 9.

Referring now to FIG. 9, there is shown a preferred embodiment of a Wallace-tree multiplier 280 constructed in accordance with the principles of the present invention. Functional performance of Wallace-tree multiplier 280 is like that of Wallace-tree multiplier 240. However, power consuming spurious switching of the type discussed hereinabove is reduced considerably. Most elements of the Wallace-tree multiplier 280 are like those in Wallace-tree multiplier 240. However, third delay elements 290 can be seen disposed in the portion of Wallace-tree multiplier 280 comprised of (3:2) counters, and fourth delay elements 300 can be seen disposed in the portion of Wallace-tree multiplier 280 comprised of (4:2) counters. The third delay elements 290 are placed in the path of the output of MUXs 260'. As mentioned above, full adders 270' also receive as inputs the outputs of the preceding stage 244, and other full adders 270 of second stage 246. See FIG. 11 for a detailed view of a portion of Wallace-tree multiplier 240 showing placement of the third delay element 290 in the input path of a full adder 270'. The signals at inputs S and C are delayed as compared with the output of the MUX 260' provided at the third input of full adder 270'. As before, the third delay element 290 has a time interval delay associated with it that is selected so as to delay the arrival of the output signal of its associated MUX by a time that contributes to causing the output signal of such MUX to arrive at its associated full adder closer in time to the arrival of the other inputs to such full adder. In other words, third delay elements 290 contribute to the synchronization of the arrival of the inputs to the full adders, without reducing the performance of the multiplier at all.

The fourth delay elements 300 are embedded in each (4:2) counter, as can best be seen in FIG. 10, which shows a (4:2) counter modified to include a fourth delay element 300. As can be seen, the delay element 300 is disposed in the path of input a3 to full adder 270". As before, the fourth delay element 300 has a time interval delay associated with it that is selected so as to delay the arrival of input a3 to full adder 270" by a time that contributes to causing input a3 to arrive at full adder 270" closer in time to the arrival of the other inputs to full adder 270". In other words, fourth delay elements 300 contribute to the synchronization of the arrival of the inputs to the full adders, without reducing the performance of the multiplier at all.

Note that it is considered preferable to provide, as the input a3 to full adder 270", a carry signal generated by the stages preceding the fifth stage 250 (FIG. 13) rather than a sum signal from such preceding stages. The reason for this is that carry signals tend to switch less frequently than sum signals, and even the switching of devices in the delay elements consume some power.

Figure 12:
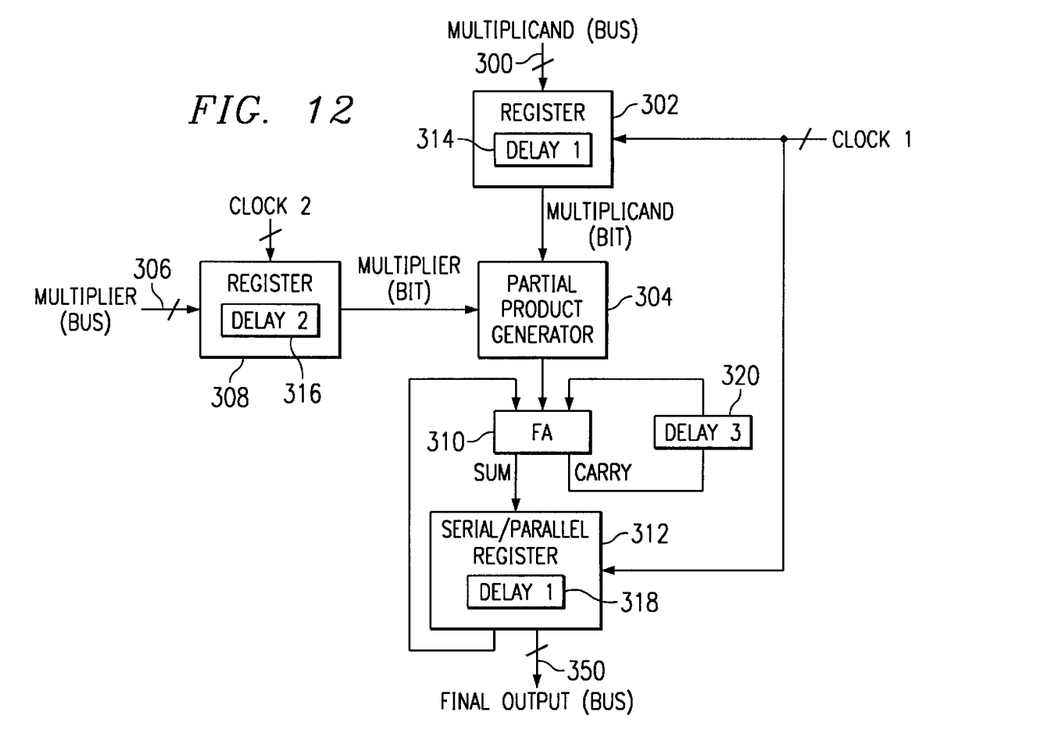
FIG. 12 is a block diagram of a preferrred embodiment of a serial multiplier in accordance with the principles of the present invention.

Other variations and embodiments can readily be contemplated, once the principles of the present invention, as described herein, are understood. For example, one embodiment of a serial multiplier modified in accordance with the principles of the present invention is shown in FIG. 12. In this embodiment, the multiplicand is provided on a first bus 300 to a first register/delay arrangement 302 that includes a set of first delay elements 314 and that performs a parallel to serial conversion, and also outputs the respective bits of the multiplicand in a timed sequence that is described hereinbelow. The output of register/delay arrangement 302 is provided as one input to a partial product generator 304. The multiplier is provided on a second bus 306 to a second register/delay arrangement 308 that includes a set of second delay elements 316 and that performs a parallel to serial conversion, and also outputs the respective bits of the multiplicand in a timed sequence that is described hereinbelow. The output of register/delay arrangement 308 is provided as the other input to partial product generator 304.

The output of partial product generator 304 is provided to one of three inputs to a full adder 310. The sum output of full adder 310 is provided as an input to a serial/parallel register and delay arrangement 312, that includes a third delay element 318, the output of which is provided as the second input of full adder 310. The carry output of full adder 310 is provided as an input to a fourth delay element 320, the output of which is provided as the third input of full adder 310. A first clock signal is provided on a line identified as Clock 1. Clock 1 is provided as an input to register/delay arrangement 302 and to serial/parallel register and delay arrangement 312. A second clock signal is provided on a line identified as Clock 2. Clock 2 is provided as an input to register/delay arrangement 308. If the multiplier and multiplicand of the multiplier of FIG. 12 each have n bits, then the period of Clock 2 is n times the period of Clock 1.

Figure 13:
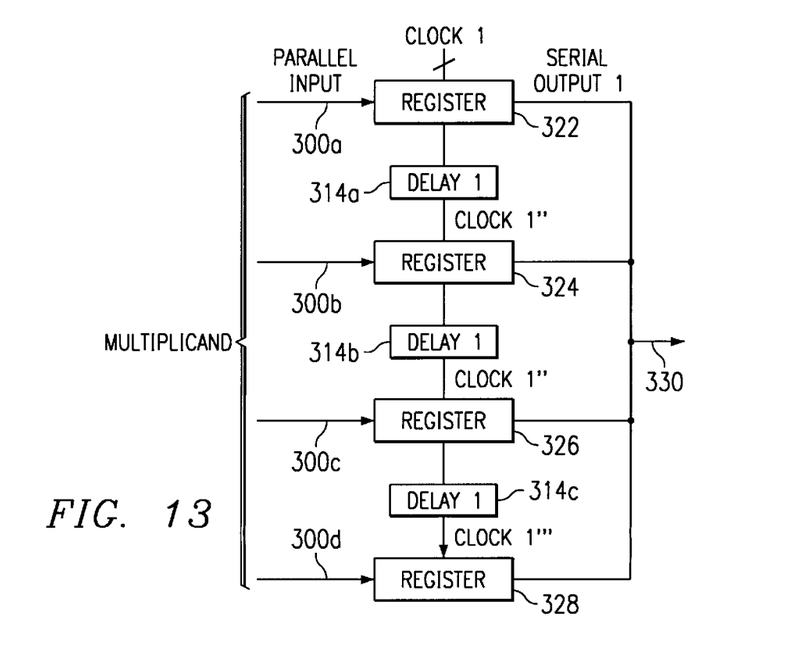
FIG. 13 is a block diagram of element 302 of FIG. 12.

A more detailed view of the first register/delay arrangement 302 is shown in FIG. 13. Four parallel input lines 300$a$, 300$b$, 300$c$, 300$d$, provide the multiplicand to four respective registers 322, 324, 326, 328. The outputs of registers 322, 324, 326, 328 are connected together and comprise the output 330 of arrangement 302. Clock 1, having true and complement parts, is provided to a clock input of register 322 and to the input of delay element 314$a$. The output of delay element 314$a$ is connected to a clock input of register 324 and to the input of delay element 314$b$, and so forth, with the output of delay element 314$c$ being connected to a clock input of register 328.

Figure 14:
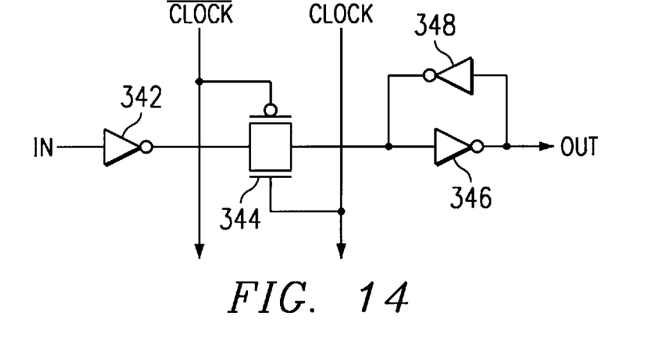
FIG. 14 is a circuit diagram of a register in the arrangement 302 shown in FIG. 13.

Details the make-up of each of the registers 322, 324, 326, 328 is shown in FIG. 14. The input is provided to a first inverter 342. The output of inverter 342 is provided to the sources of an n-channel/p-channel pass gate pair 344. The drain of the n-channel/p-channel pass gate pair 344 is connected to the input of a second inverter 346, which, with third inverter 348, forms a latch for storing the input signal.

Figure 15:
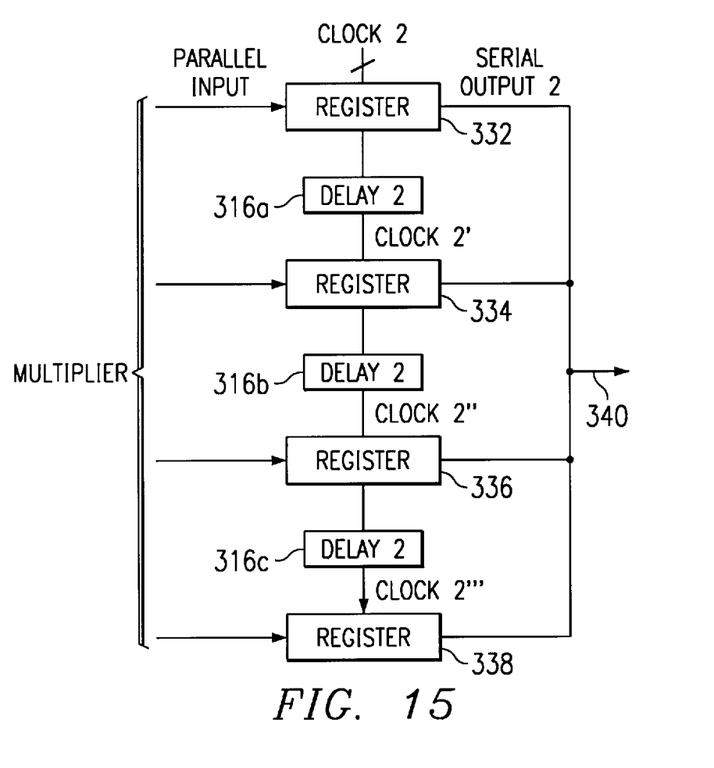
FIG. 15 is a block diagram of element 308 of FIG. 12.

A more detailed view of the second register/delay arrangement 308 is shown in FIG. 15. Four parallel input lines 306$a$, 306$b$, 306$c$, 306$d$, provide the multiplicand to four respective registers 332, 334, 336, 338. These registers have the same construction as registers 322, 324, 326, 328, shown in FIG. 14. The outputs of registers 332, 334, 336, 338 are connected together and comprise the output 340 of arrangement 308. Clock 2, having true and complement parts, is provided to a clock input of register 332 and to the input of delay element 316$a$. The output of delay element 316$a$ is connected to a clock input of register 334 and to the input of delay element 316$b$, and so forth, with the output of delay element 316$c$ being connected to a clock input of register 338.

The circuit of FIG. 12 operates generally as follows. The partial product generator 304 generates all partial products of the multiplier and multiplicand in serial fashion. Thus, for example, register/delay arrangement 302 provides the least significant bit of the multiplicand on its output, while register/delay arrangement 308 provides as outputs in clocked sequence, from least significant bit to most significant bit, the multiplier bits. In this way, partial product generator generates all bits of the first partial product.

Then, register/delay arrangement 302 provides the next significant bit, after the least significant bit, of the multiplicand on its output, while register/delay arrangement 308 provides as outputs in clocked sequence, from least significant bit to most significant bit, the multiplier bits. In this way, partial product generator generates all bits of the second partial product. The process repeats until all partial products have been generated.

The full adder 310 receives, serially, the output of the partial product generator 304, and adds such output to the serial/parallel register and delay arrangement 312. Arrangement 312 stores the outputs of full adder 310 in proper bit positions therein, and in proper sequence provides them as an input to full adder 310 such that the sums of the partial products are accumulated in arrangement 312. The delay element 318 in arrangement 312 is selected to delay the arrival of the output of arrangement 312 to the input of full adder 310 by a time that synchronizes the output of arrangement 312 with the other inputs of full adder 310. Preferably, the delay time of the third delay element 318 is selected to equal to Delay 1, described hereinbelow.

Carry outputs of full adder 310 are provided back to an input of full adder 310 through fourth delay element 320. When all partial products are added in full adder 310, the final result is available in arrangement 312 for output on final output bus 350. Note that the delay time of the fourth delay element 320 is selected to delay the arrival of the carry of full adder 310 to the input of full adder 310 by a time that synchronizes the carry output of full adder 310 with the other inputs of full adder 310. This reduces power consumption of the multiplier, without reducing the performance of the multiplier at all. Preferably, the delay time of the fourth delay element 320 is selected to equal the difference between the propagation delay through delay element 314 and the propagation delay through full adder 310.

Figure 16A:
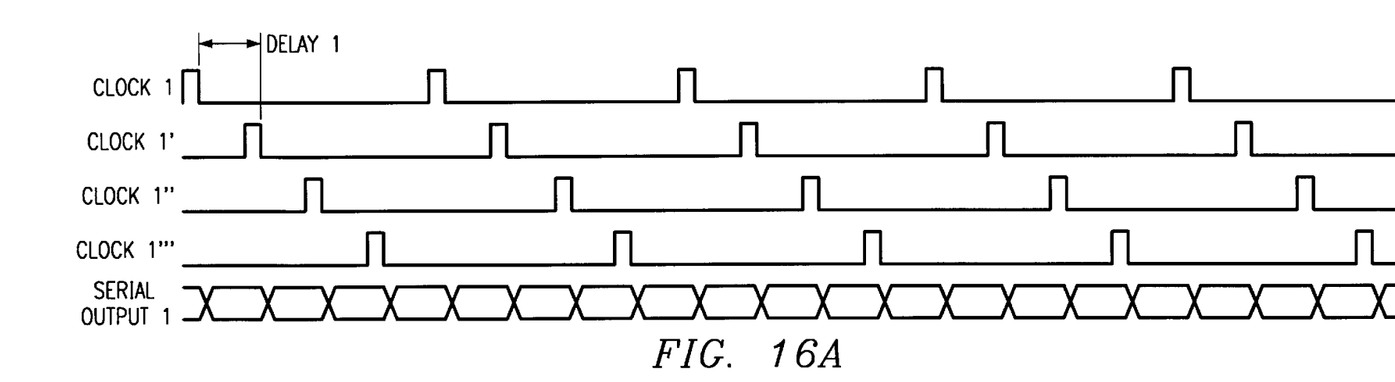
FIG. 16 is a timing diagram of signals appearing in the embodiment of FIG. 12.
Figure 16B:
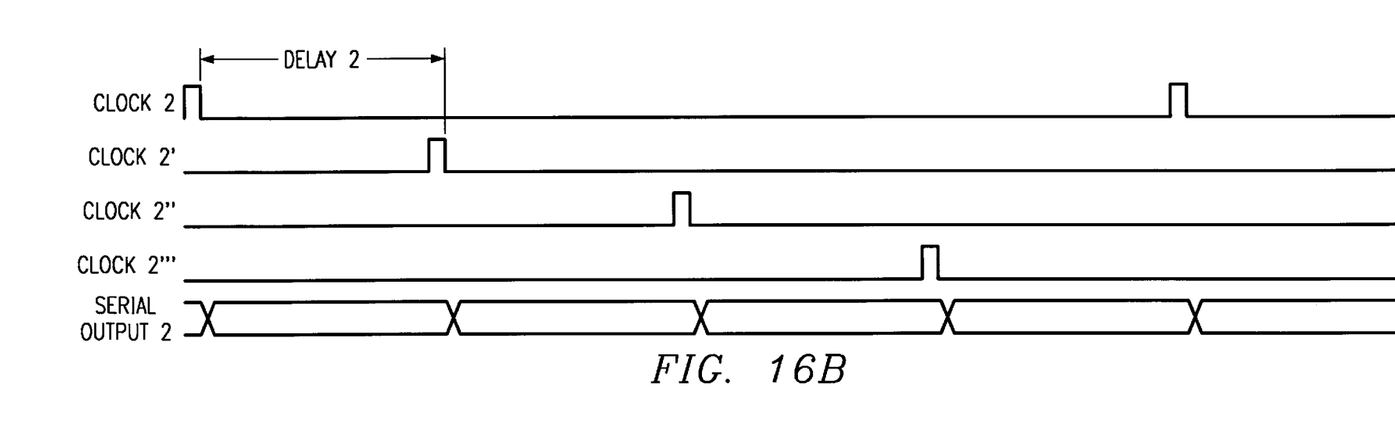

Referring to FIGS. 13, 14 and 16, operation of the first register/delay arrangement 302 will now be explained. Note that FIG. 16 is a timing diagram of the various signals that are generated and utilized in the operation of the multiplier of FIG. 12. In FIG. 13, Clock 1 is applied to the input of register 322 and to the input of delay element 314a. The pass gate 344 of register 322 being enabled by Clock 1, the input on line 300a is latched by inverter pair 348, 356 (FIG. 14), and provided as an output on line 330 (FIG. 13). Clock 1 is delayed by the delay in delay element 314a, labeled Delay 1 in FIG. 16, resulting in Clock 1', which is applied to the input of register 324 and to the input of delay element 314b. Note that Delay 1 is selected to provide Clock 1' exactly 1/n of the period of Clock 1 later than Clock 1, where n is the number of bits in the multiplier and multiplicand. Operation of register 324 is like that of register 322, and its output is provided on line 330. Note that since only one pass gate 344 in any one of registers 322, 324, 326, 328 is enabled at any given time, the output of that enabled register will control the latch state of all other registers, and thus ambiguity of the state of line 330 is avoided.

The foregoing sequence continues, with Clock 1" and Clock 1'" being generated (FIG. 16), and the outputs of registers 326 and 328 being provided on line 330. In this way, the multiplicand on line 300 is serialized and placed as Serial output 1 (FIG. 16) on line 330 (FIG. 13) in timed sequence.

The operation of the register/delay arrangement 308, shown in FIG. 15, is similar to that of register delay arrangement 302. In fact, the sequence is the same, except that timings are based on Clock 2, and the delay in delay elements 316a–c is identified as Delay 2 in FIG. 16. Note that Delay 2 is selected to provide Clock 2' exactly 1/n of the period of Clock 2 later than Clock 2, where n is the number of bits in the multiplier and multiplicand. In this way, the multiplier on line 306 is serialized and placed as Serial output 2 (FIG. 16) on line 340 (FIG. 15) in timed sequence.

Although the present invention and its advantages have been described in detail with respect to certain embodiments disclosed herein, it should be understood that various changes, substitutions and alterations can be made herein without departing from the spirit and scope of the invention as defined by the appended claims, and other embodiments can be contemplated, as well.

What is claimed is:

1. A digital multiplier for multiplying a plurality of multiplicand signals representing a multiplicand and a plurality of multiplier signals representing a multiplier, comprising:

a plurality of Booth encoders and a plurality of multiplexers associated with said plurality of Booth encoders for generating a plurality of intermediate value signals from said multiplicand signals and said multiplier signals;

a plurality of adder circuits for adding said intermediate value signals to generate result signals representing the result of multiplying said multiplicand and said multiplier;

a plurality of storage elements, each such storage element receiving as an input one of said plurality of multiplier signals and providing said stored input signal as an output to one of said Booth encoders, each of said storage elements providing said output in response to a clock signal applied to a clock input thereof; and a clock signal line connected to the clock inputs of said storage elements, and having disposed therein delay elements to cause said clock signal to be applied sequentially to said storage elements in groups associated with said Booth encoders, such that the outputs of said Booth encoders are provided to said multiplexers such that the multiplexer outputs, applied to said adders, are synchronized with the other inputs to said adders.

2. A digital multiplier according to claim 1, further comprising:

a plurality of second delay elements placed so as to delay selected intermediate result signals to said adder circuits so as to synchronize the arrival of the signals input to said adder circuits and thereby eliminate or reduce spurious switching of said adder circuits.

* * * * *